Nov. 24, 1925.  
C. A. SCHELL  
1,563,230  
FLEXIBLE DISK FOR COUPLINGS  
Filed July 12, 1921
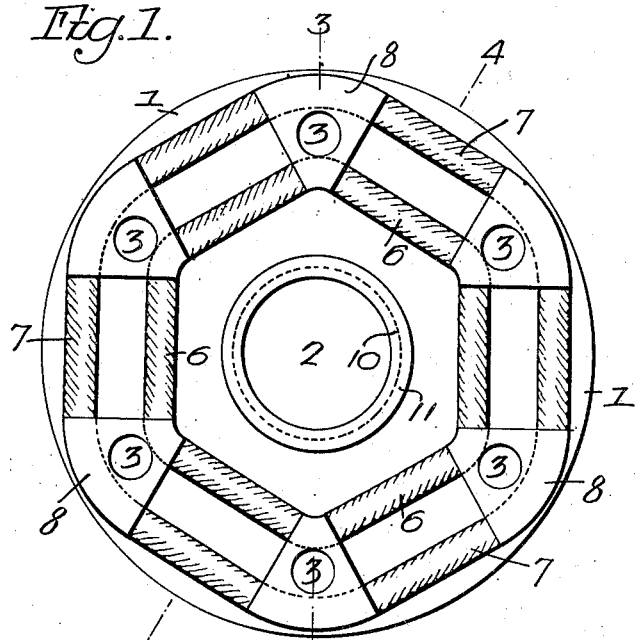
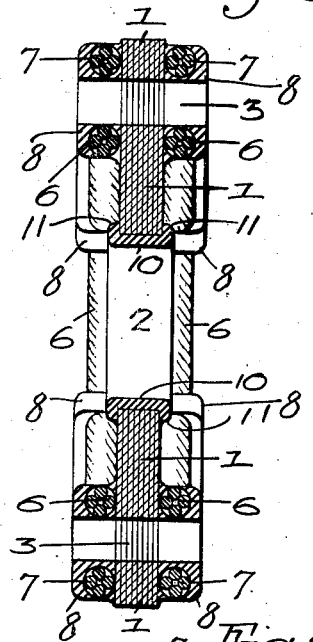
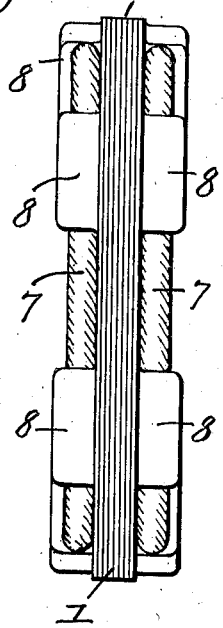
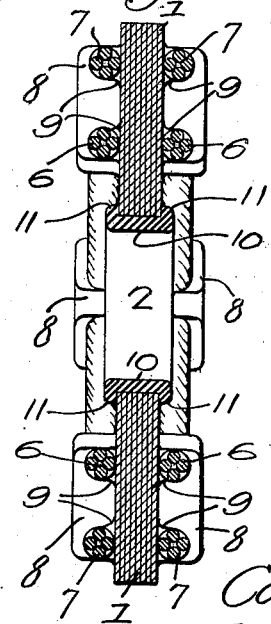
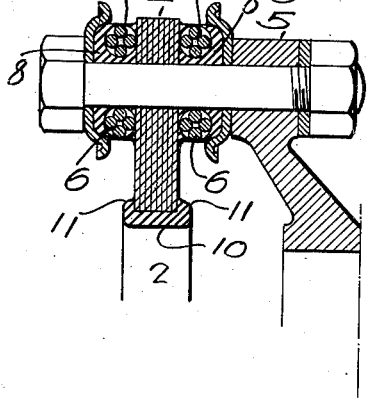
Inventor—  
Carl A. Schell.  
by his Attorneys Patented Nov. 24, 1925.

1,563,230

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

FLEXIBLE DISK FOR COUPLINGS.

Application filed July 12, 1921. Serial No. 484,254.

*To all whom it may concern:*

Be it known that I, CARL A. SCHELL, a citizen of the United States, residing in Cleveland, Ohio, have invented certain Improvements in Flexible Disks for Couplings, of which the following is a specification.

One object of my invention is to construct a flexible disk for use in connection with flexible couplings so that the disk will have the required amount of strength and the desired flexibility.

A further object of the invention is to make a disk of plies of fabric united by vulcanizable material and one or more rings of cords at the sides of the disk united to the disk by pads of rubber, said pads being at the bolt holes.

A still further object of the invention is to provide a reinforcing pad at the bolt holes, in combination with the disk and cords so that washers can be shaped to correspond to the shape of the pads in order to provide means for firmly holding the disk to the spiders.

These objects I attain in the following manner reference being had to the accompanying drawings, in which:

Fig. 1 is a face view of my improved disk;

Fig. 2 is an edge view of the disk;

Fig. 3 is a sectional view on the line 3—3, Fig. 1;

Fig. 4 is a sectional view on the line 4—4, Fig. 1; and

Fig. 5 is a sectional view illustrating the means for securing the disk to one of the arms of a spider.

Referring to the drawings, 1 is the body of the disk consisting of a series of layers of fabric and rubber, or other suitable material, capable of being vulcanized. This disk has a central opening 2 therein, in the present instance, and a series of holes 3 for the passage of the securing bolts, which fasten the disk to the spiders, one of which is shown at 5, Fig. 5. At each side of the body portion 1 of the disk are two series of cords 6 and 7. The cords 7 extend near the periphery of the disk on the outer side of the bolt holes 3, while the cords 6 extend on the inner side of the bolt holes, as shown. These cords are continuous.

Surrounding each bolt are pads 8 of rubber, which enclose the cords at this point. The cords are straight between the adjoining pads so as to take the torsional strains to which the disk is subjected. They are also united to the body of the disk by webs 9 of rubber, as shown in Fig. 4, at points between the pads. In order to prevent the plies of the body of the disk from separating at the central opening, the edges are enclosed by a ring 10 of rubber having flanges 11, which extend over the edge of the opening. When these parts are assembled, as shown, they are vulcanized under pressure producing an integral disk.

While a cord may be of four strands, as shown, it will be understood that a single cord may be used, or a number of small cords, without departing from the essential features of the invention.

I claim:

1. A flexible disk for flexible couplings consisting of a body portion of fabric and rubber vulcanized; rings of cords at each side of the disk; pads, said disk having a series of bolt holes; and pads at the bolt holes enclosing the cords.

2. A disk for flexible couplings consisting of a series of plies of fabric and rubber; two rings of cords at each side of the disk, the cords being spaced apart; bolt holes in the disk between the two series of cords; and pads at the bolt holes extending over both cord rings.

3. A disk for flexible couplings consisting of plies of fabric and rubber; a series of cord rings at each side of the disk; bolt holes in the disk between the rings of cords; and pads at the bolt holes, the cords between the pads being straight so as to take the torsional strains to which the disk is subjected.

CARL A. SCHELL.